(12) United States Patent
Chou et al.

(10) Patent No.: US 8,427,542 B2
(45) Date of Patent: Apr. 23, 2013

(54) IMAGE CALIBRATION METHOD AND IMAGE PROCESSING SYSTEM UTILIZING THE METHOD

(75) Inventors: Cheng-Chung Chou, Hsin-Chu (TW); Yi-Hsien Ko, Hsin-Chu (TW); Wei-Ting Chan, Hsin-Chu (TW)

(73) Assignee: PixArt Imaging Inc., Science-Based Industrial Park, Hsin-Chi (TW)

( * ) Notice: Subject to any disclaimer, the term of this patent is extended or adjusted under 35 U.S.C. 154(b) by 551 days.

(21) Appl. No.: 12/543,490

(22) Filed: Aug. 18, 2009

(65) Prior Publication Data

US 2010/0265335 A1    Oct. 21, 2010

(30) Foreign Application Priority Data

Apr. 20, 2009  (TW) .............................. 98113031 A

(51) Int. Cl.
*H04N 17/00* (2006.01)
*H04N 17/02* (2006.01)
*H04N 3/14* (2006.01)
*H04N 5/335* (2006.01)
*H04N 9/64* (2006.01)
*H04N 5/217* (2006.01)
*H04N 5/228* (2006.01)
*H04N 7/167* (2006.01)

(52) U.S. Cl.
USPC ........... 348/187; 348/294; 348/245; 348/241; 348/222.1; 380/210

(58) Field of Classification Search ........................ None
See application file for complete search history.

(56) References Cited

U.S. PATENT DOCUMENTS

| 7,612,803 | B2 * | 11/2009 | Meitav et al. ............... 348/222.1 |
| 2005/0041806 | A1 * | 2/2005 | Pinto et al. ..................... 380/210 |
| 2006/0114343 | A1 * | 6/2006 | Zhang et al. ................... 348/294 |
| 2009/0109305 | A1 * | 4/2009 | Dai et al. ....................... 348/245 |
| 2009/0278962 | A1 * | 11/2009 | Richardson et al. .......... 348/241 |

FOREIGN PATENT DOCUMENTS

EP          1237353 A1    9/2002

\* cited by examiner

*Primary Examiner* — Jefferey Harold
*Assistant Examiner* — Sean Haiem
(74) *Attorney, Agent, or Firm* — Winston Hsu; Scott Margo

(57) ABSTRACT

An image calibration method includes: (a) sensing at least one target pixel of a sensing row from an effective pixel region of an image sensor to generate at least one target pixel value; (b) sensing at least one reference pixel of a shading region in the image sensor to generate a calibration value, wherein the reference pixel and the sensing row do not belong to the same row; and (c) referring to the calibration value to calibrate and output the target pixel value.

10 Claims, 5 Drawing Sheets

IMAGE CALIBRATION METHOD AND IMAGE PROCESSING SYSTEM UTILIZING THE METHOD

BACKGROUND OF THE INVENTION

1. Field of the Invention

The present invention relates to an image calibration method and an image processing system using the method, and more particularly, to an image calibration method that does not use pixels in the same row as reference pixels, and an image processing using the method.

2. Description of the Prior Art

An image processing system has an image sensor (e.g., a charge-coupled device, a CCD) for sensing incident light from a target object and converting the incident light into electric charges. FIG. 1 is a block diagram of a conventional image sensor 100. As shown in FIG. 1, the image sensor 100 includes a pixel array 101 and a row sensor 103. The pixel array 101 usually includes an effective pixel area 105 and an original shading region 107. However, some other image sensors may further include a reference shading region 108. The row sensor 103 is implemented for sensing pixels of the effective pixel region 105, and the sensing manner thereof senses all pixels at the same sensing row at once, for example, all pixels within a sensing row 109 or 100, and then outputs sensed pixel values one by one. Reference pixel regions (called black pixel regions) 111 and 112 are for calibrating sensed pixel values within the sensing rows 109 and 110, respectively. This is because there may be background noise within each image, and sensing pixel values of the reference shading region 108 helps to acquire the background noise and thereby derive a calibration value. Next, the calibration value is used to calibrate pixel values to be outputted. For example, an outputted pixel value is derived from a pixel value within the sensing row 109 or 100 minus the calibration value.

However, this kind of mechanism is only available for calibrating the sensed row having a reference shading region located within the same sensed row, resulting in an inflexible circuit design.

SUMMARY OF THE INVENTION

One objective of the present invention is therefore to provide an image calibration method and image processing system using the method which is capable of using a shading region located within a row different from a sensed row to act as a reference pixel region.

One exemplary embodiment of the present invention discloses an image calibration method, including: (a) sensing at least one target pixel of a sensing row from an effective pixel region of an image sensor to generate at least one target pixel value; (b) at the same time point when the step (a) is executed, sensing at least one reference pixel of a shading region in the image sensor to generate a calibration value, wherein the reference pixel and the sensing row do not belong to the same row; and referring to the calibration value to calibrate the target pixel value.

Another exemplary embodiment of the present invention discloses an image processing system, including a pixel array, a row sensor and a calculating unit. The pixel array includes an effective pixel region which comprises a plurality of sensing rows, and a shading region. The row sensor is for sensing at least one target pixel of one of the sensing rows to generate at least one target pixel value; additionally, at the same time point when sensing one of the sensing rows, the row sensor senses at least one reference pixel of the shading region to generate a reference pixel value, wherein the reference pixel and the sensing row do not belong to the same row. The calculating unit is for referring to the reference pixel value to generate a calibration value and for calibrating the target pixel value according to the calibration value.

According to the aforementioned embodiments, it is feasible to make the sensed row different from the row at which the reference pixel is located, leading to an enhancement of system capability. Furthermore, original hardware structure can be adopted without additional components added thereto. Thus, no extra hardware cost is required.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
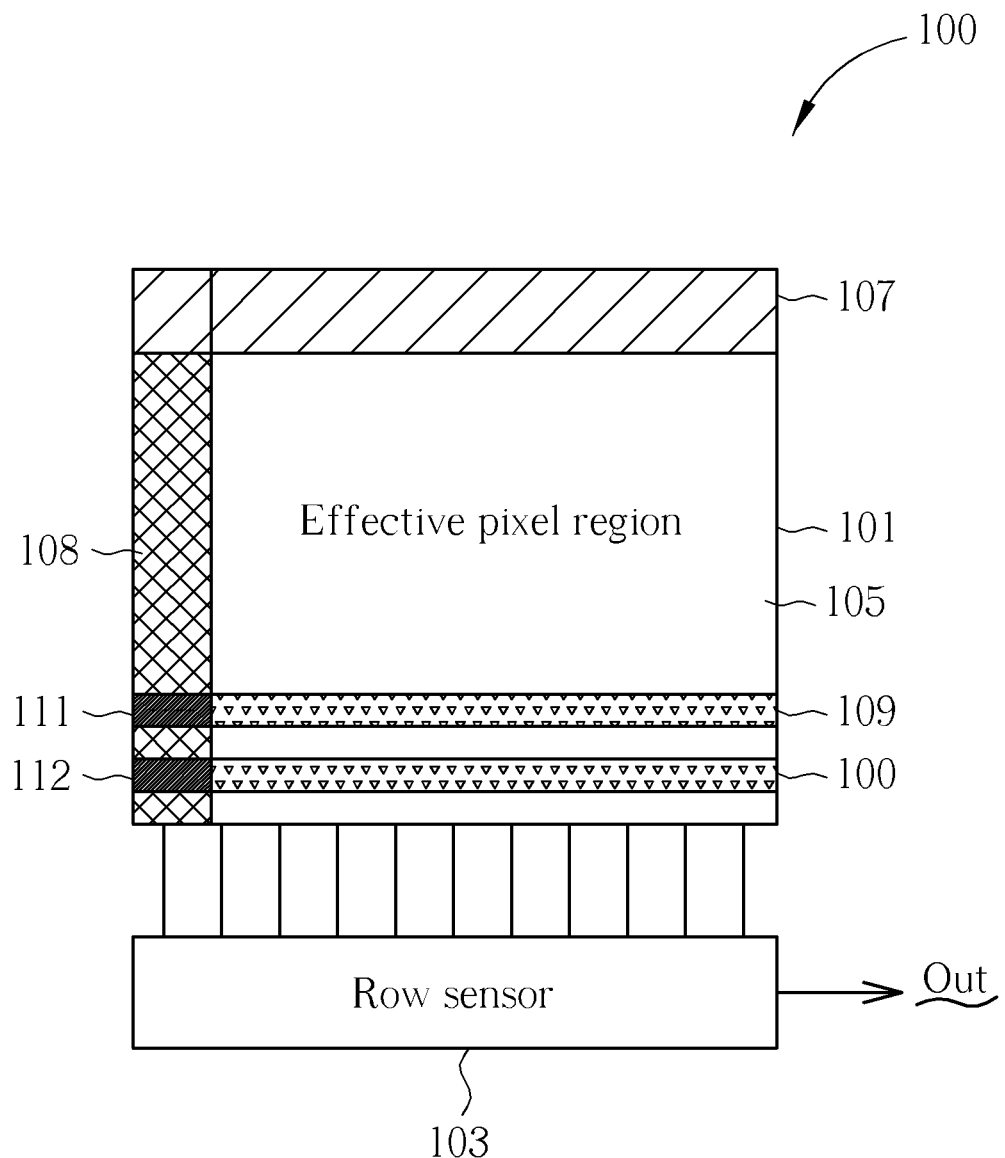
FIG. 1 is a block diagram of a conventional image sensor.
Figure 2:
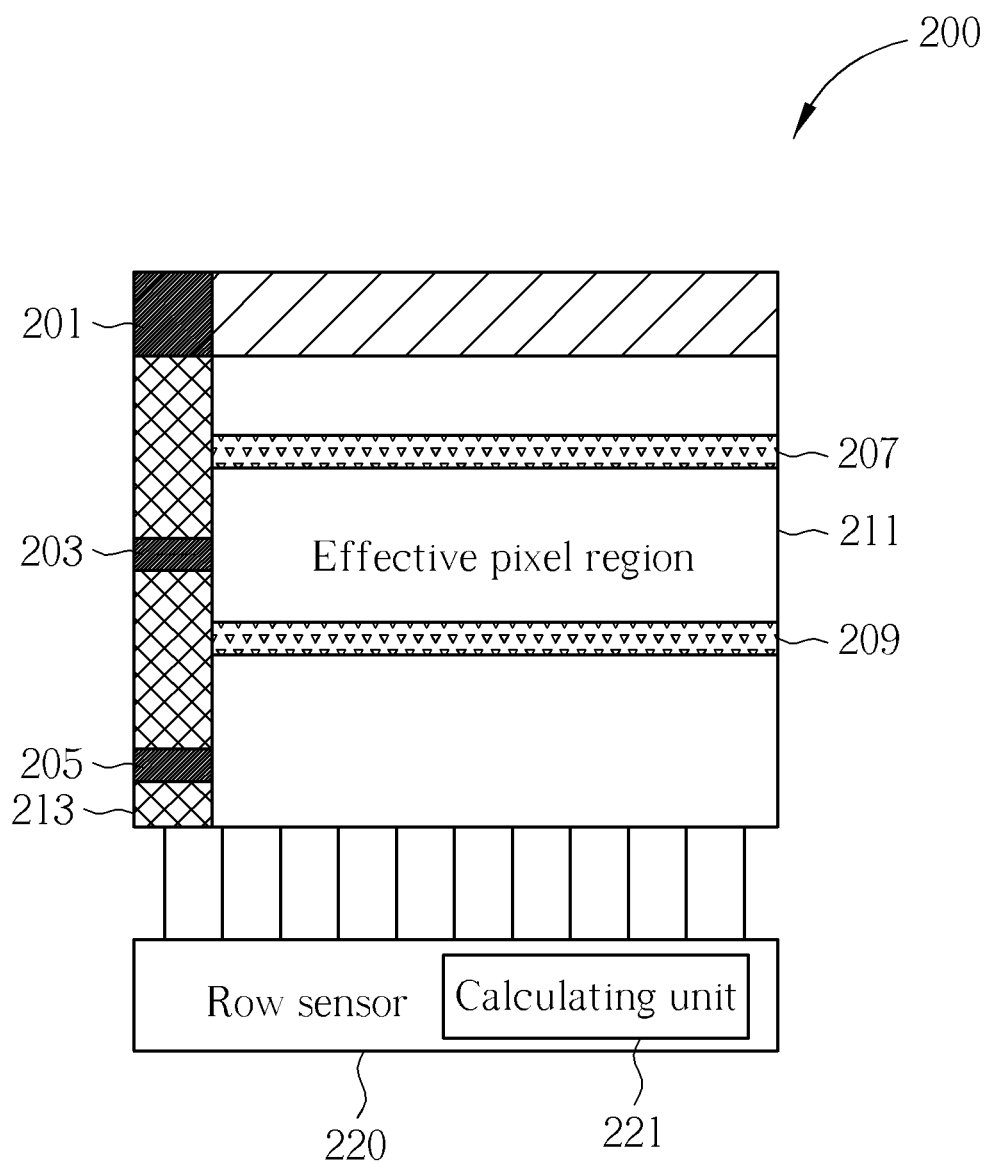
FIG. 2 is a diagram of an image calibration method according to a first embodiment of the present invention.

FIG. 2 is a diagram of an image calibration method according to a first embodiment of the present invention. In this exemplary embodiment, a fixed shading region (e.g., a shading region 201, 203 or 205), instead of shading regions located at the same rows as sensing rows 207 and 209, is chosen to serve as a reference pixel region. The reason for adopting this mechanism is that background noise of the image relates to a time point. Therefore, as long as the time point is the same, regardless of the location of a pixel, the background noise is also the same. Any fixed shading region can be chosen to serve as the reference pixel region. Flexibility of system capability is thereby improved.

Figure 3:
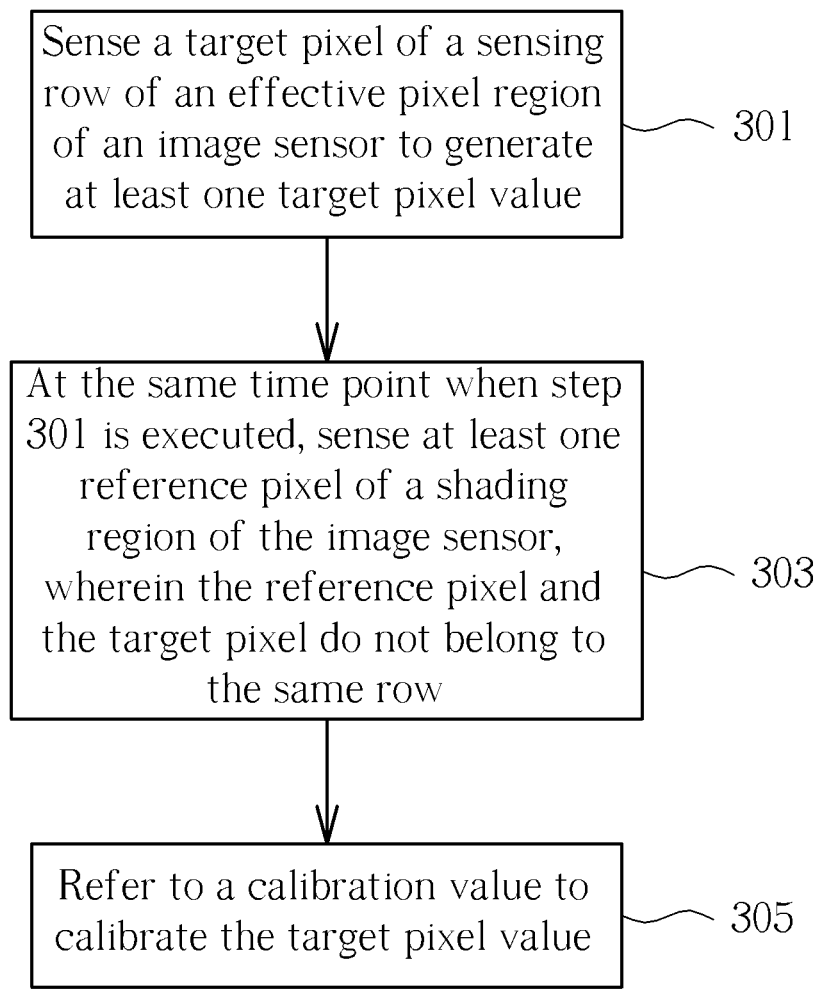
FIG. 3 is a flowchart of an image calibration method according to the first embodiment of the present invention.

The first embodiment of the present invention as shown in FIG. 2 can be manifested by a flowchart of an image calibration method shown in FIG. 3. FIG. 3 includes steps 301, 303 and 305. Step 301 senses a target pixel of a sensing row (207 or 209) of an effective pixel region (211) of an image sensor (200) to generate at least one target pixel value. At the same time point when step 301 is executed, step 303 senses at least one reference pixel of a shading region (213) of the image sensor (200), wherein the reference pixel and the target pixel do not belong to the same row. In this embodiment, step 303 senses a fixed region within the shading region (213). Step 305 generates a calibration value and refers to the calibration value to calibrate the target pixel value.

Figure 4:
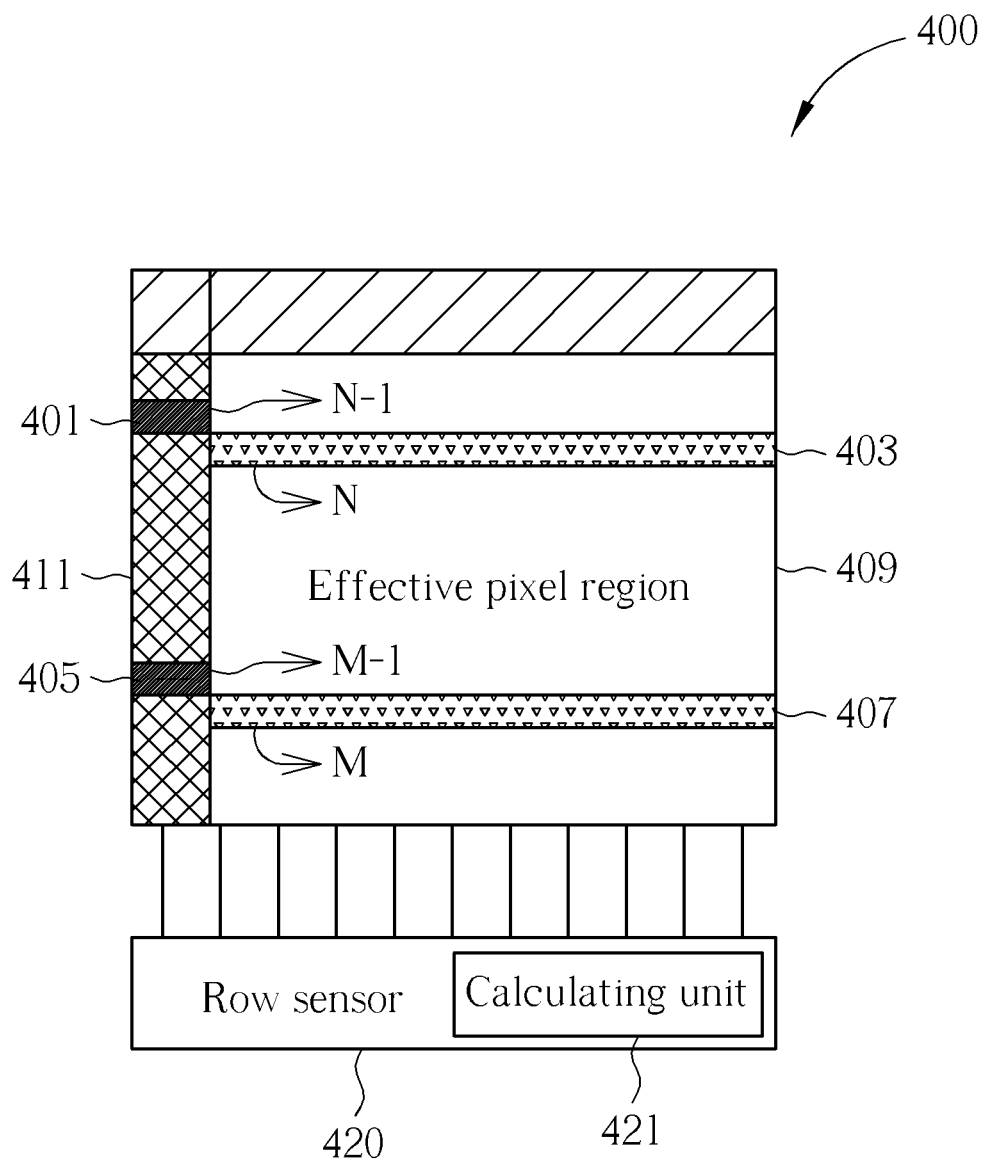
FIG. 4 is a diagram of an image calibration method according to a second embodiment of the present invention.

FIG. 4 is a diagram of an image calibration method according to a second embodiment of the present invention. In this embodiment, the reference pixel region is not a fixed region. Shading regions 401, 405, chosen as reference pixel regions, are located at rows one row prior to the sensed rows 403, 407, respectively. In other words, if the sensed row 403 is the row N, then the corresponding shading region 401 is located at the row N−1; and if the sensed row 407 is the row M, then the corresponding shading region 405 is located at the row M−1. With this mechanism, the conventional problem that the reference pixel region has to be located at the same row as the sensed row can be solved. It should be noted that the row at which the reference pixel region is located could be different from the sensed row by more than one row, i.e., the row at which the reference pixel region is located could bear a specific relation with the sensed row. In this embodiment, the specific relation is that the row at which the reference pixel region is located could be different from the sensed row by one row.

Figure 5:
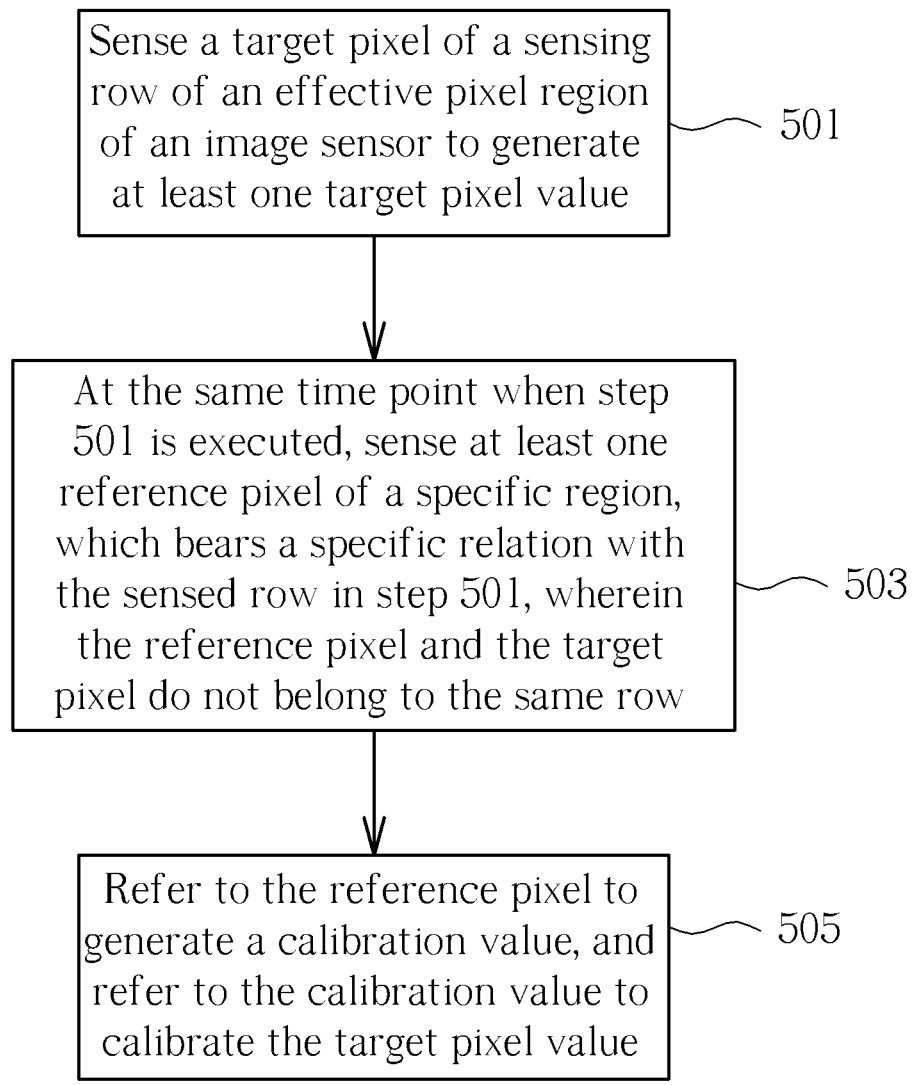
FIG. 5 is a flowchart of an image calibration method according to the second embodiment of the present invention.

The second embodiment of the present invention as shown in FIG. 4 can be manifested by a flowchart of an image calibration method shown in FIG. 5. FIG. 5 includes steps 501, 503 and 505. Step 501 senses a target pixel of a sensing row (403 or 407) of an effective pixel region (409) of an image sensor (400) to generate at least one target pixel value. At the same time point when step 501 is executed, step 503 senses at least one reference pixel of a shading region (411) of the image sensor (400) to generate a calibration value, wherein the reference pixel and the target pixel do not belong to the same row. In this embodiment, step 503 senses at least one reference pixel of a specific region, which bears a specific relation with the sensed row in step 501, in the shading region 411. In one embodiment, the specific area is located in a row N, and the sensing row sensed in the step 501 is located in the row N+X, wherein N and X are integers larger than 1 (i.e., the row at which the reference pixel region is located is different from the sensed row by more than one row). Step 505 refers to the calibration value to calibrate the target pixel value.

In the aforementioned embodiments, an average value of pixel values of the reference pixels can be derived to act as the calibration value. In an alternative design, a maximum value and a minimum value of those pixel values of the reference pixels could be discarded first, and an average value of those pixel values of the remaining reference pixels is derived to serve as the calibration value. It should be noted that methods of calculating the calibration value according to pixel values of the reference pixels should be well known to those skilled in this field, and are not limited to the aforementioned exemplary methods. Furthermore, in the aforementioned embodiments, step 305 and step 505 could be respectively implemented by means of calculating units, such as the calculating unit 221 shown in FIG. 2 and the calculating unit 421 shown in FIG. 4. The calculating units 221 and 421 could be integrated into the row sensors 220 and 420, or be independent from the row sensors 220 and 420, respectively.

According to the embodiments above, the sensed row could be different from the row at which the reference pixel is located, leading to an enhancement of system capability. Furthermore, original hardware structure can be adopted without additional components added thereto. Thus, no extra hardware cost is required.

Those skilled in the art will readily observe that numerous modifications and alterations of the device and method may be made while retaining the teachings of the invention.

What is claimed is:

1. An image calibration method, for calibrating an image sensed by an image sensor including a pixel array having an effective pixel region and a shading region, wherein the effective pixel region includes at least one target pixel and the shading region includes at least one reference pixel, where each row of the pixel array includes at least one of the target pixel and at least one of the reference pixel, comprising:
    (a) sensing at least one of the target pixel to generate at least one target pixel value;
    (b) at a same time point when step (a) is executed, sensing at least one of the reference pixel to generate a calibration value, wherein the reference pixel and the target pixel sensed at the same time point do not belong to the same row, wherein the reference pixel is located in a row N, and the target pixel is located in a row N+X, where X is a non-zero integer having a fixed value and N is a positive integer; and
    (c) referring to the calibration value to calibrate and output the target pixel value.

2. The image calibration method of claim 1, wherein the shading region comprises a plurality of regions, and step (b) senses a fixed region within the plurality of regions to generate the calibration value for the target pixels in different rows.

3. The image calibration method of claim 1, wherein the shading region comprises a plurality of regions, and step (b) senses at least one reference pixel of a specific area, which bears a specific relation with the target pixel sensed in step (a), within the shading region.

4. The image calibration method of claim 1, wherein step (b) senses a plurality of pixel values of reference pixels of the shading region, and calculates an average value of the pixel values of the reference pixels to serve as the calibration value.

5. The image calibration method of claim 4, further comprising:
    discarding a maximum value and a minimum value of the pixel values of the reference pixels, and then calculating an average value of pixel values of remaining reference pixels to serve as the calibration value.

6. An image processing system, comprising:
    a pixel array, comprising:
        an effective pixel region, including at least one target pixel; and
        a shading region, including at least one reference pixel;
        wherein each row of the pixel array includes at least one of the target pixel and at least one of the reference pixel;
    a row sensor, for sensing at least one of the target pixel to generate at least one target pixel value, and at a same time point when sensing the target pixel, sensing at least one of the reference pixel to generate a reference pixel value, wherein the reference pixel and the target pixel sensed at the same time point do not belong to the same row, wherein the reference pixel is located in a row N, and the target pixel is located in a row N+X, where X is a non-zero integer having a fixed value and N is a positive integer; and
    a calculating unit, for referring to the reference pixel value to generate a calibration value and for calibrating the target pixel value according to the calibration value.

7. The image processing system of claim 6, wherein the shading region comprises a plurality of regions, and the row sensor senses a fixed region within the plurality of regions to generate the calibration value for the target pixels in different rows.

8. The image processing system of claim 6, wherein the shading region comprises a plurality of regions, and the row sensor senses at least one reference pixel of a specific area, which bears a specific relation with the target pixel sensed by the row sensor, within the shading region.

9. The image processing system of claim 6, wherein the calculating unit calculates an average value of pixel values of reference pixels to serve as the calibration value.

10. The image processing system of claim 9, wherein the calculating unit discards a maximum value and a minimum value of the pixel values of the reference pixels, and then calculates an average value of pixel values of remaining reference pixels to serve as the calibration value.

* * * * *